(12) United States Patent
Molde et al.

(10) Patent No.: US 10,415,681 B2
(45) Date of Patent: Sep. 17, 2019

(54) LINEAR ACTUATOR

(71) Applicant: TEAM Industries, Inc., Bagley, MN (US)

(72) Inventors: Stephen James Molde, Bemidji, MN (US); Cody Jay Wentzel, Bemidji, MN (US); Matthew Douglas Cann, Bemidji, MN (US)

(73) Assignee: TEAM Industries, Inc., Bagley, MN (US)

( * ) Notice: Subject to any disclaimer, the term of this patent is extended or adjusted under 35 U.S.C. 154(b) by 0 days.

(21) Appl. No.: 15/862,740

(22) Filed: Jan. 5, 2018

(65) Prior Publication Data

US 2018/0195596 A1 Jul. 12, 2018

Related U.S. Application Data

(60) Provisional application No. 62/443,184, filed on Jan. 6, 2017.

(51) Int. Cl.
*F16H 48/34* (2012.01)
*F16H 25/20* (2006.01)
(Continued)

(52) U.S. Cl.
CPC ......... *F16H 48/34* (2013.01); *F16H 25/2015* (2013.01); *F16H 48/08* (2013.01);
(Continued)

(58) Field of Classification Search
None
See application file for complete search history.

(56) References Cited

U.S. PATENT DOCUMENTS

| 2,444,886 | A | * | 7/1948 | Vickers | ............... F16H 25/2204 |
| | | | | | 119/223.3 |
| 3,400,610 | A | * | 9/1968 | Taylor | ..................... F16H 48/22 |
| | | | | | 192/99 S |

(Continued)

FOREIGN PATENT DOCUMENTS

| CN | 104534086 A | 4/2015 |
| DE | 10030409 A1 | 5/2001 |

(Continued)

OTHER PUBLICATIONS

European Patent Office, "Extended European Search Report for EP Application No. 18150477.0 dated Jun. 8, 2018", "Foreign Counterpart to U.S. Appl. No. 15/862,740", filed Jun. 8, 2018, pp. 1-9, Published in: EP.

*Primary Examiner* — Dirk Wright
(74) *Attorney, Agent, or Firm* — Fogg & Powers LLC (57) ABSTRACT

A linear actuator that includes a torque generator, a lead screw, a driven nut, an activation circuit and a push rod. The torque generator has an output shaft. The lead screw is operationally coupled to the output shaft of the torque generator. The driven nut has an internally threaded bore that threadably engages external threads of the lead screw in such a manner that frictional forces between the internal threaded bore and the external threads prevent movement between the driven nut and the lead screw when no torque is provided by the torque generator. The activation circuit is in communication with the torque generator. The activation circuit has at least one switch that is configured to be activated by the driven nut. The push rod is operationally coupled to the driven nut.

20 Claims, 10 Drawing Sheets

(51) Int. Cl.
*F16H 48/24* (2006.01)
*H01H 3/16* (2006.01)
*F16H 48/08* (2006.01)
*F16H 48/20* (2012.01)

(52) U.S. Cl.
CPC ............ *F16H 48/20* (2013.01); *F16H 48/24* (2013.01); *H01H 3/16* (2013.01); *F16H 2025/2081* (2013.01); *F16H 2048/343* (2013.01); *F16H 2048/346* (2013.01)

(56) References Cited

U.S. PATENT DOCUMENTS

| | | | | |
|---|---|---|---|---|
| 4,425,814 A * | 1/1984 | Dick | ............ | F16H 63/304 |
| | | | | 192/109 A |
| 4,440,035 A * | 4/1984 | Foulk | ............ | F16D 28/00 |
| | | | | 464/46 |
| 4,498,350 A * | 2/1985 | Ross | ............ | F16H 63/304 |
| | | | | 192/109 A |
| 4,775,026 A | 10/1988 | Sollbach et al. | | |
| 4,793,458 A * | 12/1988 | Shealy | ............ | F16H 63/304 |
| | | | | 192/141 |
| 4,805,486 A | 2/1989 | Hagiwara et al. | | |
| 4,838,118 A | 6/1989 | Binkley | | |
| 4,895,236 A | 1/1990 | Sakakibara et al. | | |
| 5,106,349 A | 4/1992 | Botterill et al. | | |
| 5,267,635 A * | 12/1993 | Peterson | ............ | F16D 48/064 |
| | | | | 192/84.6 |
| 5,279,401 A | 1/1994 | Stall | | |
| 5,353,902 A * | 10/1994 | Flowtow | ............ | F16D 23/12 |
| | | | | 192/84.6 |
| 5,689,997 A * | 11/1997 | Schaller | ............ | F16H 61/32 |
| | | | | 74/335 |
| 5,878,624 A * | 3/1999 | Showalter | ............ | F16H 63/304 |
| | | | | 74/473.37 |
| 6,503,167 B1 * | 1/2003 | Sturm | ............ | F16H 48/22 |
| | | | | 192/84.6 |
| 8,291,783 B2 * | 10/2012 | Shi | ............ | E05F 15/622 |
| | | | | 74/89.39 |
| 9,022,890 B2 * | 5/2015 | Smetana | ............ | F16D 3/06 |
| | | | | 475/149 |
| 9,103,420 B2 * | 8/2015 | Wu | ............ | F16H 25/20 |
| 9,358,882 B2 | 6/2016 | Hapka | | |
| 9,951,850 B2 * | 4/2018 | Kramer | ............ | F16H 61/32 |
| 10,221,898 B2 * | 3/2019 | Castillo | ............ | G06F 1/1601 |
| 2009/0250284 A1 | 10/2009 | Mochizuki et al. | | |
| 2011/0269595 A1 | 11/2011 | Marsh et al. | | |
| 2017/0368934 A1 * | 12/2017 | Edelen | ............ | B60K 17/02 |

FOREIGN PATENT DOCUMENTS

| | | |
|---|---|---|
| EP | 2202870 A2 | 6/2010 |
| JP | H04317537 A | 11/1992 |
| JP | 2001041312 A | 2/2001 |
| JP | 2008095711 A | 4/2008 |
| RU | 173594 U1 | 8/2017 |
| WO | 2016014823 A1 | 1/2016 |
| WO | 2016014827 A1 | 1/2016 |

* cited by examiner

Circuit Phases

FIG. 4A

Position 1: Closed Circuit, Actuator Plunging Forward

FIG. 4B

Position 2: Open Circuit, Actuator Fully Engaged

FIG. 4C

Position 3: Closed Circuit, Actuator Retracting

FIG. 4D

Position 4: Open Circuit, Actuator Fully Retracted

LINEAR ACTUATOR

CROSS-REFERENCE TO RELATED APPLICATIONS

This Application claims priority to U.S. Provisional Application Ser. No. 62/443,184, titled Linear Actuator, filed on Jan. 6, 2017, which is incorporated in its entirety herein by reference.

BACKGROUND

Vehicles employ one or more differentials to allow an outer drive wheel to rotate faster than an inner drive wheel during cornering as both drive wheels continue to receive torque from an engine. While differentials are useful during cornering, they may allow the vehicle to lose traction, for example in mud, snow or other slick medium. Limited-slip differentials have been developed to address this loss of traction issue. Moreover, some types of vehicles, such as, but not limited to, recreational vehicles including all-terrain vehicles (ATVs) and utility task vehicles (UTVs) implement front and rear locking differentials to accommodate vehicle operational characteristic preferences. The locking mechanism of locking differentials selectively lock rotation of the drive wheels together based on a desired operational characteristic. A typical locking system employs a solenoid that requires a constant current draw during implementation of the locking system.

SUMMARY OF INVENTION

The following summary is made by way of example and not by way of limitation. It is merely provided to aid the reader in understanding some of the aspects of the invention. Embodiments provide a linear actuator locking system that selectively locks a differential or other component without requiring a constant current draw to be maintained after implementation of a locking feature of the system. Moreover, embodiments of the linear actuator are effective, efficient, compact, simple and affordable.

In one embodiment a linear actuator that includes a torque generator, a lead screw, a driven nut, an activation circuit and a push rod is provided. The torque generator has an output shaft. The lead screw is operationally coupled to the output shaft of the torque generator. The driven nut has an internally threaded bore that threadably engages external threads of the lead screw in such a manner that frictional forces between the internal threaded bore and the external threads prevent movement between the driven nut and the lead screw when no torque is provided by the torque generator. The activation circuit is in communication with the torque generator. The activation circuit has at least one switch that is configured to be activated by the driven nut. The push rod is operationally coupled to the driven nut.

In another embodiment, a differential with a linear actuator lock that includes a shift dog, a shift fork, an electric motor, a lead screw, a driven nut, an activation circuit and a push rod is provided. The shift dog is configured to selectively engage a portion of the differential to selectively lock the differential. The shift fork is operationally engaged with the shift dog wherein movement of the shift fork moves the shift dog. The electric motor has an output shaft. The lead screw is operationally coupled to the output shaft of the electric motor. The driven nut has an internally threaded bore that threadably engages external threads of the lead screw in such a manner that frictional forces between the internal threaded bore and the external threads prevent movement between the driven nut and the lead screw when no torque is provided by the torque generator. The activation circuit is in communication with the electric motor. The activation circuit has at least one switch that is configured to be activated by the driven nut. The push rod is operationally coupled to the driven nut. The push rod is further operationally coupled to the shift fork.

In another embodiment, a vehicle including an engine, a transmission, at least one differential and at least one linear actuator is provided. The transmission is operationally coupled to the engine. The at least one differential is operationally coupled to the transmission. The at least one linear actuator is used to selectively lock the at least one differential. The at least one linear actuator includes an electric motor, a lead screw, a driven nut, an activation circuit and a push rod. The electric motor has an output shaft. The lead screw is operationally coupled to the output shaft of the electric motor. The driven nut has an internally threaded bore that threadably engages external threads of the lead screw in such a manner that frictional forces between the internal threaded bore and the external threads prevent movement between the driven nut and the lead screw when no torque is provided by the torque generator. The activation circuit is in communication with the electric motor. The activation circuit has at least one switch that is configured to be activated by the driven nut. The push rod is operationally coupled to the driven nut. The push rod is further operationally coupled to the shift fork.

Instill another embodiment, a method of selectively locking a differential is provided. The method includes applying a current in a first direction to an electric motor to move a driven nut on a lead screw that is operationally coupled to the electric motor. A push rod is moved with the driven nut. The push nut is operationally engaged with a shift dog that is configured to engage a portion of the differential to selectively lock the differential upon movement of the push rod. At least a first switch is activated to remove the current to the electric motor once the shift dog has locked the differential, wherein a configuration of the driven nut on the lead screw retains the differential in a locked configuration after the current has been removed from the electric motor.

BRIEF DESCRIPTION OF THE DRAWINGS

The present invention can be more easily understood and further advantages and uses thereof will be more readily apparent, when considered in view of the detailed description and the following figures in which.

In accordance with common practice, the various described features are not drawn to scale but are drawn to emphasize specific features relevant to the present invention. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the invention, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Embodiments of the present invention provide an actuation system and method to engage and disengage a vehicle (such as, but no limited to ATV/UTV) front and/or rear locking differential. Embodiment may also be implemented in a disconnect system to selectively engage and disengage two wheel drive to four wheel drive in a vehicle. Embodiments do not require an electrical current once the motion of locking feature has been completed. Moreover, embodiments provide a compact, efficient, and low cost locking mechanism.

Figure 1:
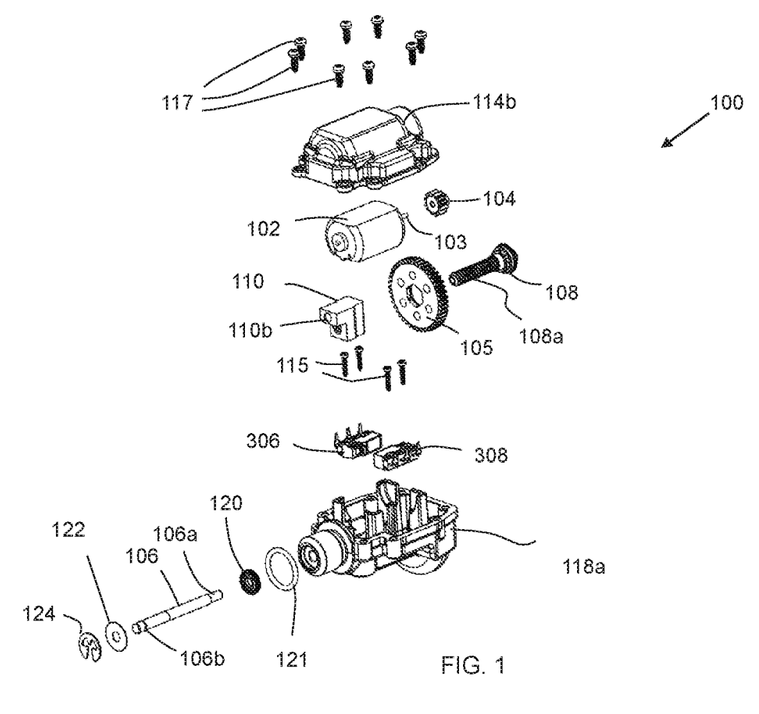
FIG. 1 is an unassembled side view of a linear actuator according to one exemplary embodiment.
Figure 2:
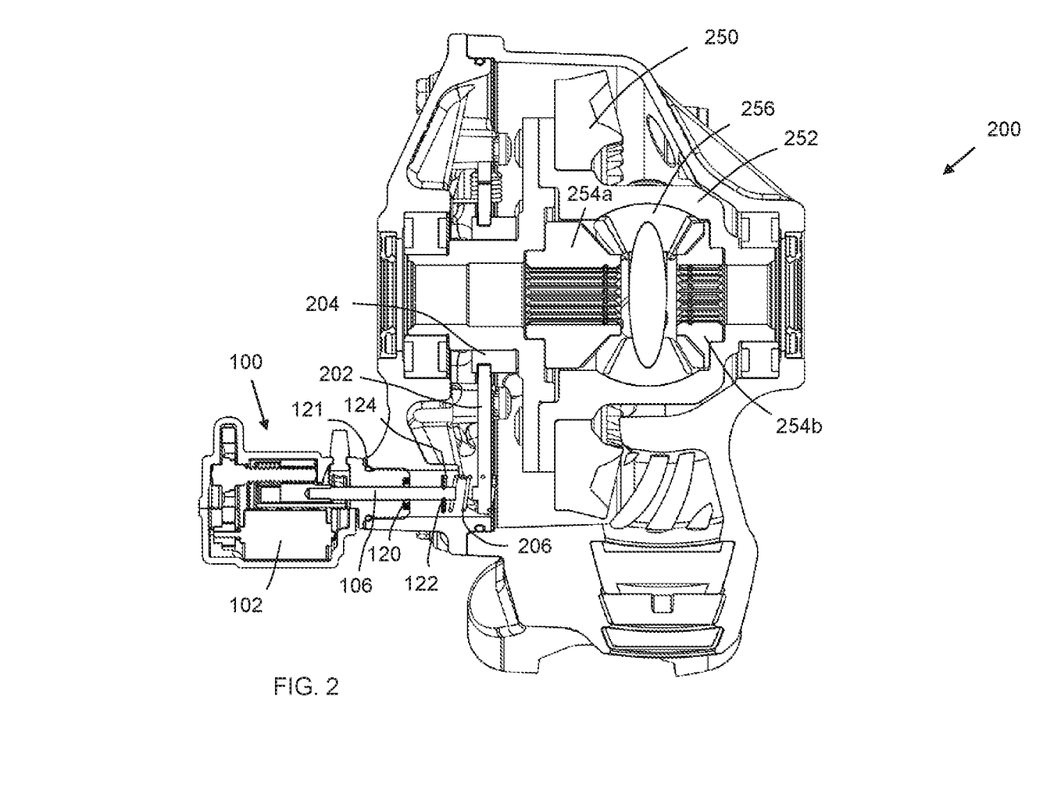
FIG. 2 is a cross-sectional assembled view of a differential and the linear actuator of FIG. 1.

Referring to FIG. 1, a linear actuator 100 of an embodiment is illustrated. The linear actuator 100 includes a direct current motor 102 (or torque generator). A gear reduction train that includes a first gear 104 and a second gear 105 is rotationally coupled to a rotation output shaft 103 of the motor 102. The gear reduction train is operationally coupled to move a push rod 106 a defined distance to activate a mechanism inside a gearbox (such as, but not limited to, a differential such as differential 200 shown in FIG. 2). Rotational motion of the output shaft 103 of the motor 102 is converted into linear motion via lead screw 108. In particular, the second gear 105 of the gear reduction train is rotationally coupled to the lead screw 108 to convey rotation of the output shaft 103 of the motor 102 to the lead screw 108. The lead screw 108 includes external threads 108a that engage internal threads of a driven nut 110 as best illustrated in FIG. 2. A first end 106a of the push rod 106 is held in a holding bore 110a of the driven nut 110. This connection causes the push rod 106 to linearly move with the driven nut 110. Two electrical mechanical switches 306 and 308 are used to control the distance of travel of the push rod 106 and driven nut 110. The electrical switches 306 and 308 are mounted in a first housing portion 114a via fasteners 115. The first housing portion 114a is mounted to a second housing portion 114b via fasteners 117. In an embodiment, the components are sealed within the housing (114a and 114b) via seal between the housings portions 114a and 114b (not shown) and seal 120. Seal 120 is positioned about an internal passage of the first housing 114a and the push rod 106. Further seal 121 creates a seal between the linear actuator 100 and a housing of the differential 200 or other device. Also illustrated in FIG. 1 is a washer 122 that is positioned to engage a shoulder of the push rod 106 and a retaining clip 124 that is engaged proximate a second end 106b of the push rod 106.

FIG. 2 illustrates a differential 200 including the linear actuator 100 of FIG. 1. In this embodiment, the push rod 106 is operationally engaged with a shift fork 202 in the differential 200. The shift fork 202 in turn is engaged with an engagement dog 204 that selectively locks the differential 200. In this embodiment, a biasing member 206 that is positioned between the shift fork 202 and the washer 122 and retaining clip 124 arrangement on the push rod 106, is used at least in part to manipulate the movement of the shift fork 202.

The differential 200 in this example embodiment is illustrated as including a ring gear 250, a carrier 252, a first side gear 254a, a second side gear 254b and a first pinion gear 256. A second pinon gear is not illustrated in this cross-sectional side view. The engagement dog 204 is configured to selectively engage the first side gear 254a in this example embodiment to selectively lock the differential 200. As discussed above, shift fork 202, under control of the linear actuator 100, selectively slides the engagement dog 204 to engage the first side gear 254a to lock the differential.

Figure 3:
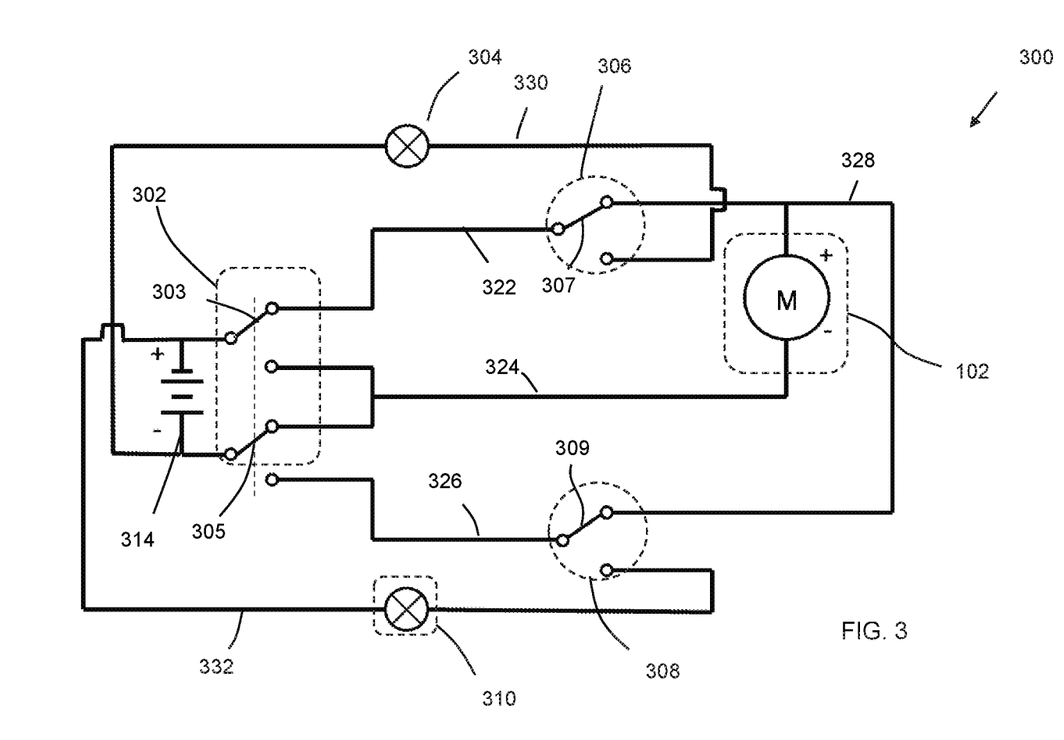
FIG. 3 is a activation circuit according to one exemplary embodiment.

FIG. 3 illustrates an activation circuit 300 used to operate the linear actuator 100 in an embodiment. The activation circuit 300 is reconfigurable via double pole double throw (DPDT) switch 302 that works with the first switch 306 and the second switch 308 to selectively operate motor 102. The circuit 300 includes a power supply 314. Electrically coupled to the power supply 314 is the DPDT switch 302. The DPDT switch 302 include a first pole 303 that is selectively positioned to make an electrical connection between a first side of the power supply (positive polarity side in this example) and a first conductive path 322 or a second conductive path 324. The DPDT switch 302 further includes a second pole 305 that is selectively positioned to make an electrical connection between a second side of the power supply (negative polarity side in this example) and the second conductive path 324 or a third conductive path 326.

The first switch 306 includes a pole 307 that is selectively positioned to make an electrical connection between the first conductive path 322 and a fourth conductive path 328 or a fifth conductive path 330. The fifth conductive path 330 is couple to the second side of the power supply 314. The second switch 308 includes a pole 309 that is selectively positioned to make an electrical connection between the third conductive path 326 and the fourth conductive path 328 or a sixth conductive path 332. The sixth conductive path is coupled to the first side of the power supply 314. A first electrical connection of the motor 102 is coupled to the second conductive path 324 and a second electrical connection of the motor is coupled to the fourth conductive path 328. Positioned in the fifth conductive path 330 is a first indicator 304 and positioned within the sixth conductive path 332 is a second indicator 310.

Figure 4A:
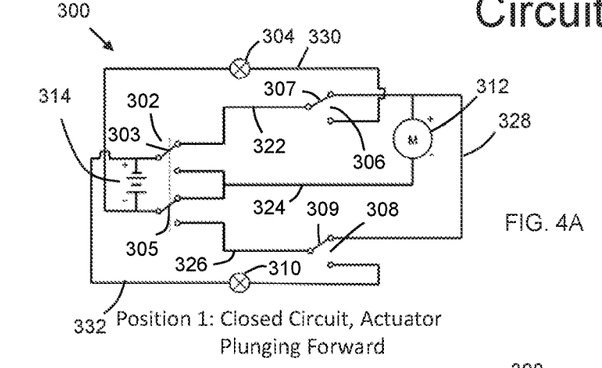
FIG. 4A through 4D illustrate different circuit phases of the activation circuit during operation of the linear actuator of FIG. 1.

Referring to FIGS. 4A through 4D as discussion of the operation of the activation circuit 300 is provide. FIG. 4A illustrates an actuator plunging forward configuration. In this configuration, the circuit 300 is closed activating the motor 312 to move the push rod 106 towards the shift fork 202 to move the shift fork 202 and the engagement dog 204. In this configuration, the first pole 303 of the DPDT switch 302 couples the first side (positive polarity side in this example) of the power supply 314 to the first conductive path 322. Pole 307 of the first switch 306 is positioned to connect the first conductive path 322 to the fourth conductive path 328. The second pole 305 of the DPDT switch 302 in this configuration connects the second side (negative polarity side in this example) to the second conductive path 324. Hence current from the power supply 314 in this configuration passes through the second conductive path 324, through the motor 102 back to the power supply 302 via fourth and first conductive paths 328 and 322. As discussed, the current flowing through the motor 102 in this direction causes the output shaft 103 of the motor 102 to rotate in a direction that causes the push rod 106 to move towards the shift fork 202 and activate the engagement dog 204.

Figure 4B:
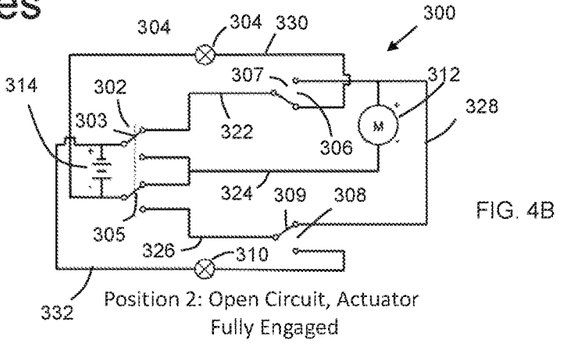

FIG. 4B illustrates an actuator fully engaged configuration of the activation circuit 300. In this configuration, the first and second poles 303 and 305 of the DTDP switch 302 and pole 309 of the second switch 308 remain in the same position as in the actuator plunging forward configuration discussed above, but pole 307 of the first switch 306 is positioned to couple the first conductive path 322 to the fifth conductive path 330. Hence current is not passing through the motor 102 (open circuit) in this configuration and hence the output shaft 103 of the motor 102 is not rotating. This configuration is implement when the push rod 106 has fully engaged the shift fork 202 in locking the differential 200 via the engagement dog 204. Indicator 304 indicates the linear actuator 100 has locked the differential 200.

Figure 4C:
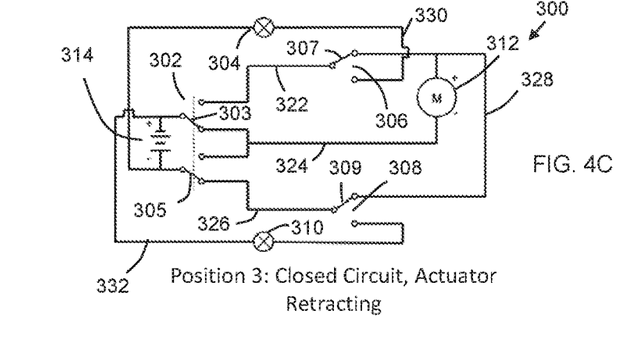

FIG. 4C illustrates an actuator retracting configuration of the activation circuit 300. In this configuration, the first pole 303 of the DPDT switch 302 couples the first side of the power supply 314 (the positive polarity side) to the second conductive path 324 and the second pole 305 of the DPDT switch 302 couples the second side of the power supply 314 to the third conductive path 326. In addition, pole 307 of the first switch 306 is positioned to couple the first conductive path 322 to the fourth conductive path 328 and pole 309 of the second switch 308 couples the third conductive path 326 to the fourth conductive path 328. In this configuration, current flows from the power supply 314 through the third conductive path 326, through the fourth conductive path 328, through the motor 102 and back to the power supply 314 via the second conductive path 324. Hence, in this configuration, current flows through the motor 102 in the opposite direction than it did in the actuator plunging forward configuration discussed above. This causes the output shaft 103 of the motor 102 to rotate in a direction that is opposite the direction than the actuator rotates during the plunging forward configuration which causes the push rod 106 to move away from the shift fork 202 which in turn causes the engagement dog 204 to disengage the first side gear 254a of the example of FIG. 2.

Figure 4D:
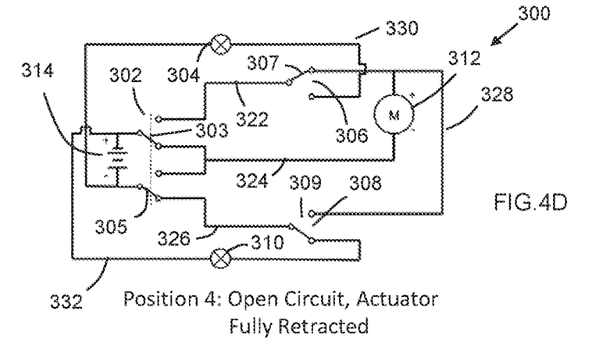

FIG. 4D illustrates an actuator fully retracted configuration of the activation circuit 300. In this configuration the first and second poles 303 and 305 of the DPDT switch 302 and pole 307 of the first switch 306 remain in the same position as in the actuator retraction configuration. However, pole 309 of the second switch 308 is positioned to couple the third conductive path 326 to the sixth conductive path 332 therein ceasing the current path through the motor 102. This actuator fully retracted configuration is implemented once the push rod 106 has is no longer working on the shift fork 202 and the differential is no longer locked. Indictor 310 is used to indicate the differential is not locked. In one embodiment, the indicators 304 and 310 are position detectors that detect the position of a component of the actuator, such as the push rod 106 or the driven nut 110, at the end of a stroke to determine if the differential is locked or not. In one example embodiment, the indicators 304 and 310 use LED lights. However, other types of indicators are contemplated.

Figure 5:
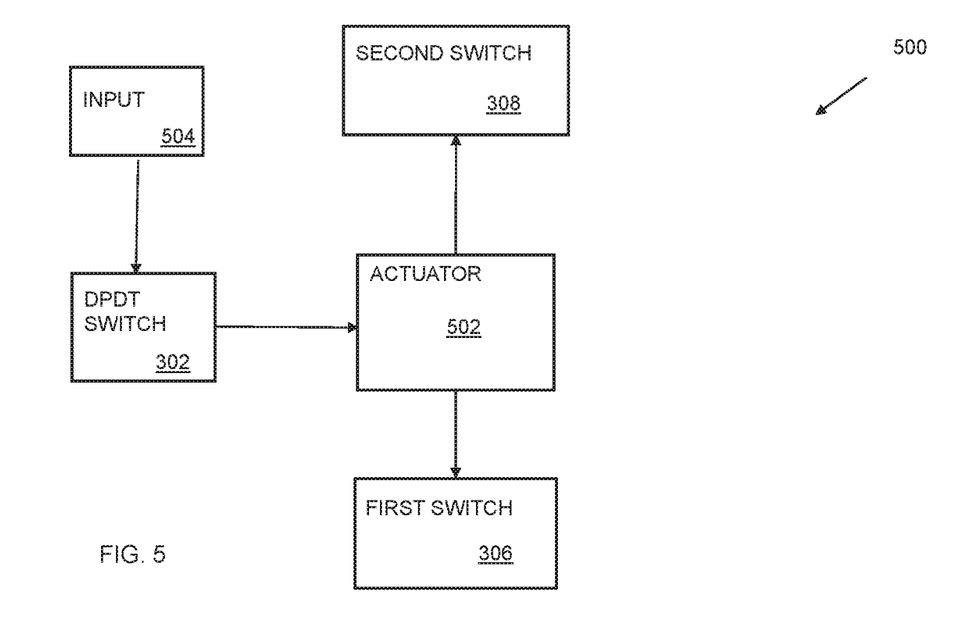
FIG. 5 is a block diagram of a control system according to one exemplary embodiment.

FIG. 5 illustrates a block diagram of a control system 500 of an embodiment. The control system 500 includes an input 504. In an embodiment, the input 504 is an operator input that is used by the operator to select when to activate the linear actuator 502. In another embodiment, a controller is used to activate the linear actuator 502 based on sensors inputs indicating a then current operational state of a vehicle implementing the linear actuator 502. The input 504, in the embodiment of FIG. 5 controls the DPDT switch 302. The DPDT switch 302 controls the actuator 502, which in an embodiment, includes the push rod 106/driven nut 110 arrangement discussed above. The actuator 502 in turn controls switches 306 and 308. For example, switches 306 and 308 may be operationally positioned to activate upon the completion of a stroke of the push rod 106, driven nut 110 or other component of the actuator 502. For example, as the completion of actuator 502 from position 1 of FIG. 4A to position 2 of FIG. 4B is accomplished, a position of a component of the actuator 502 at the end of the lock stroke activates switch 306, to cause the motor 312 to cease operation. Similarly, upon the completion of the actuator 502 from position 3 of FIG. 4C to position 4 of FIG. 4D is accomplished, a position of a component of the actuator 502 at the end of the unlock stroke activates switch 308, to cause the motor 312 to cease operation. Moreover, the movement of the component of the actuator 502 at the beginning of a respective stroke further activates a respective switch 306 or 308 to set the poles of the respective switches 306 or 308 in a correct position for operation.

Figure 6:
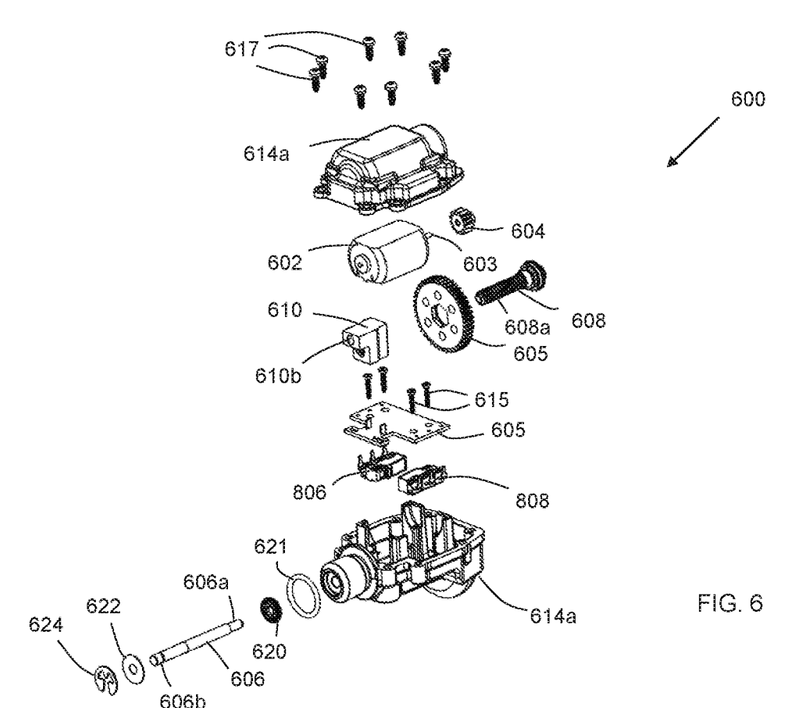
FIG. 6 is an unassembled side view of a linear actuator according to another exemplary embodiment.

Referring to FIG. 6, a linear actuator 600 of another embodiment is illustrated. The linear actuator 600 includes a direct current motor 602. A gear reduction train that includes a first gear 604 and a second gear 605 is rotationally coupled to a rotation output shaft 603 of the motor 602. The gear reduction train is operationally coupled to move a push rod 606 a defined distance to activate a mechanism inside a gearbox (such as, but not limited to, a differential such as differential 200 shown in FIG. 2). Rotational motion of the output shaft 603 of the motor 602 is converted into linear motion via lead screw 608. In particular, the second gear 605 of the gear reduction train is rotationally coupled to the lead screw 608 to convey rotation of the output shaft 603 of the motor 602 to the lead screw 608. The lead screw 608 includes external threads 608a that engage internal threads 610a in a threaded bore 611 of a driven nut 610 as best illustrated in the close up cross sectional view of FIG. 8.

A first end 606a of the push rod 606 is held in a holding bore 610b of the driven nut 610. This connection causes the push rod 606 to linearly move with the driven nut 610. Two electrical mechanical switches 806 and 808 are used to control the distance of travel of the push rod 606 and driven nut 610 as best illustrated in the cross sectional view of FIG. 7. The electrical switches 806 and 808 are mounted in a first housing portion 614a via fasteners 615. Switches 806 and 808 include switch manipulation portions 806a and 808a respectfully that are selectively activated by the driven nut 610 as the driven nut moves along the lead screw 608. Different than the linear actuator 100 example of FIG. 1, linear actuator 600 of FIG. 6 includes a circuit board 605 that includes the wiring to the switches and in an embodiment includes a controller as discussed above. The fasteners 615 also fasten the circuit board 605 to the first housing portion in this example embodiment.

Figure 7:
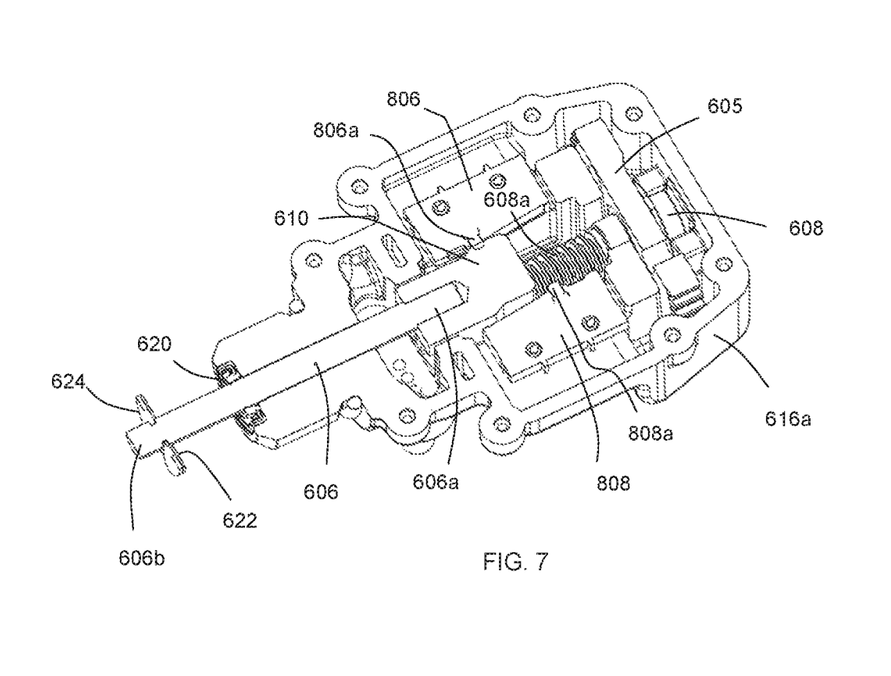
FIG. 7 is a cross-sectional side view of the assembled linear actuator of FIG. 6.

The linear actuator 600 is illustrated in the cross sectional side perspective view of FIG. 7 as being in an extended state.

This corresponds to position two: open circuit, actuator fully engaged configuration circuit of FIG. 4B illustrated above using switch 806 in place of switch 306 and switch 808 in place of switch 308. In this extended state of FIG. 7, the manipulation portion 806a of the switch 806 is triggered by the driven nut 610 to achieve the open circuit. Mechanical movement of the linear actuator 600 is locked in a static configuration by the interface between the external threads 608a of the lead screw 108 and the internal treads 610a in the threaded bore 611 of the driven nut 610.

Figure 8:
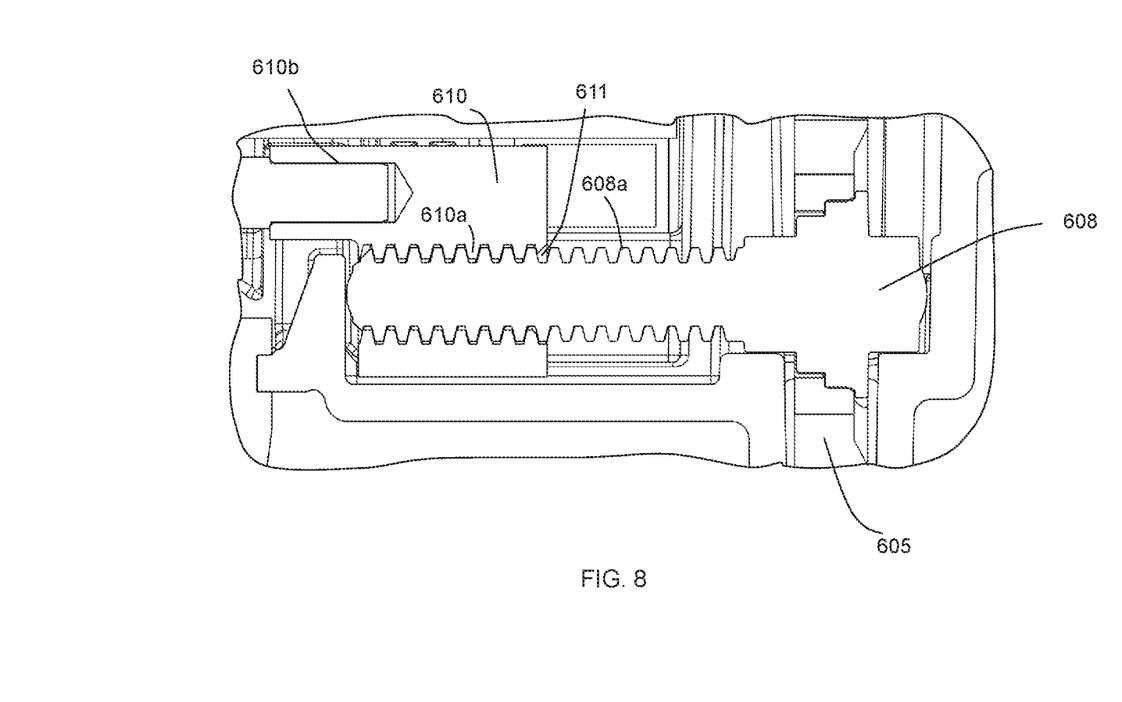
FIG. 8 is a partial close up side view of the assembled linear actuator of FIG. 6 illustrating an interaction between the lead screw and driven nut.

The linear actuator 600 remains locked due to friction between the external threads 608a of the lead screw 608 and internal threads 610a of the threaded bore 611 of the driven nut 610. This locking feature continues to remain locked during the open circuit as long as the friction angle of the internal thread interface is larger than the lead angle of lead screw 108. Determining a configuration that accomplishes the level of friction needed in an embodiment can be determined with thread of lead screw λ and a friction angle ψ equations as follows:

$$\lambda = \operatorname{atan}\left(\frac{p}{d \cdot \pi}\right) = 5.195 \text{ deg}$$

$$\psi = \operatorname{atan}\left(\frac{\mu}{\cos(\alpha)}\right) = 11.672 \text{ deg}$$

Where p equals a thread pitch, d equals a thread pitch diameter, p equals a friction coefficient at thread interface and a equals a thread half angle.

The first housing portion 614a is mounted to a second housing portion 614b via fasters 617. In an embodiment, the components are sealed within the housing (614a and 614b) via seal between the housings portions 614a and 614b (not shown) and seal 620. Seal 621 creates a seal between the linear actuator 600 and a device housing, such as a differential housing. Also illustrated in FIG. 6 is a washer 622 that is positioned to engage a shoulder of the push rod 606 and a retaining clip 624 that is engaged proximate a second end 606b of the push rod 606.

Figure 9:
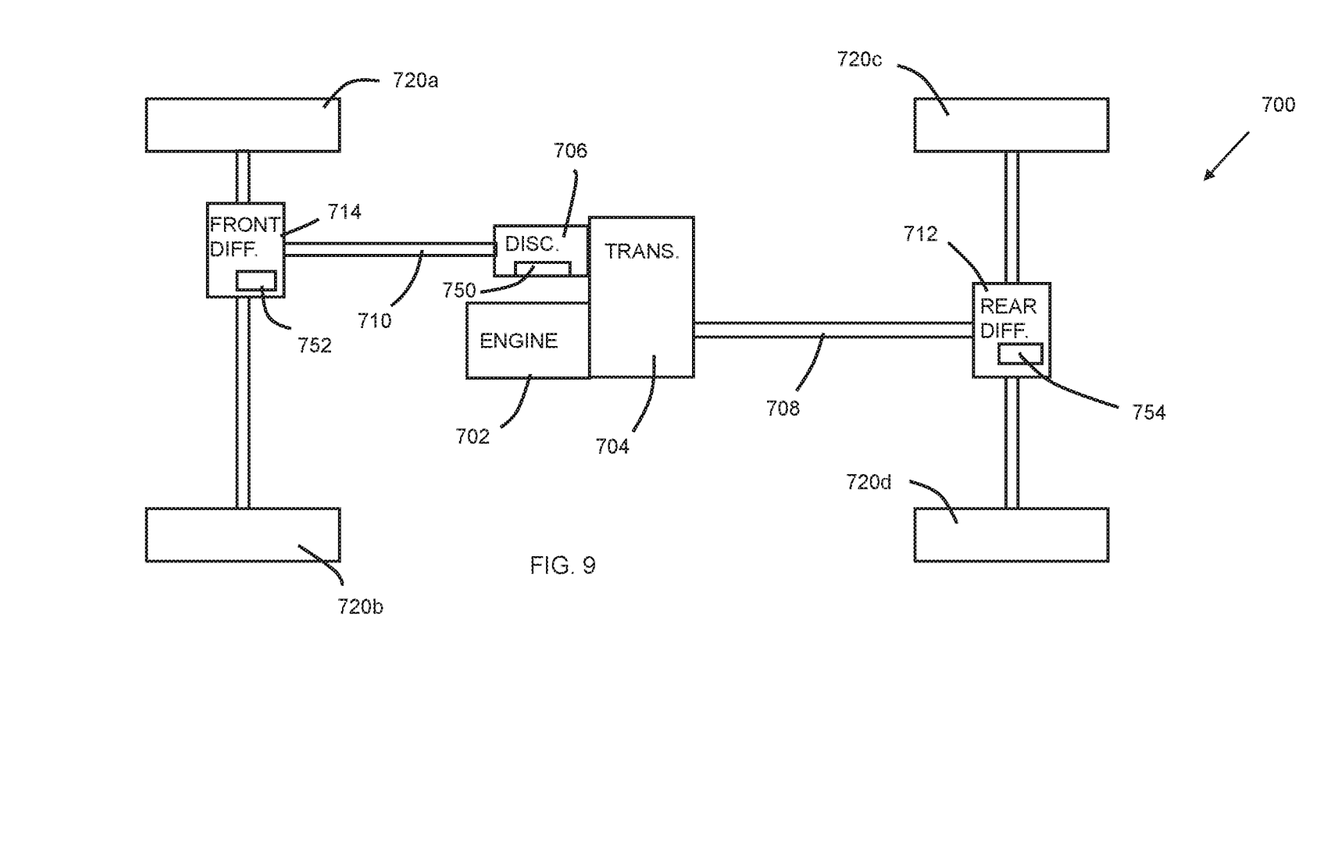
FIG. 9 is a block diagram of a vehicle according to one exemplary embodiment.

Referring to FIG. 9, a vehicle 700 implementing embodiments of the linear actuator is illustrated. The vehicle includes, an engine 702 to provide torque. A transmission 704 is operationally coupled to the engine 702. The transmission 704 in this embodiment includes a first output to a rear drive shaft 708 and a second output that is operationally coupled to a disconnect 706 in this embodiment. A front drive shaft 710 is operationally positioned between the disconnect 706 and a front differential 714. The front differential 714 is operationally coupled to a pair of front wheels 720a and 720b. Moreover, the rear drive shaft 708 is operationally coupled to the rear differential 712 which is in turn operationally coupled to a pair of rear wheels 720c and 720d. As discussed above, the vehicle implements embodiments of the linear actuator 100 and 600 discussed above. In particular, a linear actuator 750, similar to linear actuator 100 or 600, is used to selectively connect and disconnect a rotational output of the transmission 704 to the front drive shaft 710 therein selecting between two wheel and four wheel drive. Although, the disconnect 706 is illustrated between the transmission 704 and front drive shaft 710 in another embodiment it is positioned between the front differential 714 and the front drive shaft 710. Moreover, other configurations are contemplated. In the embodiment of FIG. 9, both the front differential 714 and the rear differential 712 include linear actuators 752 and 754 respectively, similar to linear actuator 100 or 600 and differential 200 configuration described above. Other vehicle embodiments, may implement less or more linear actuators 100 or 600 depending on the desired requirements of the vehicle.

Figure 10A:
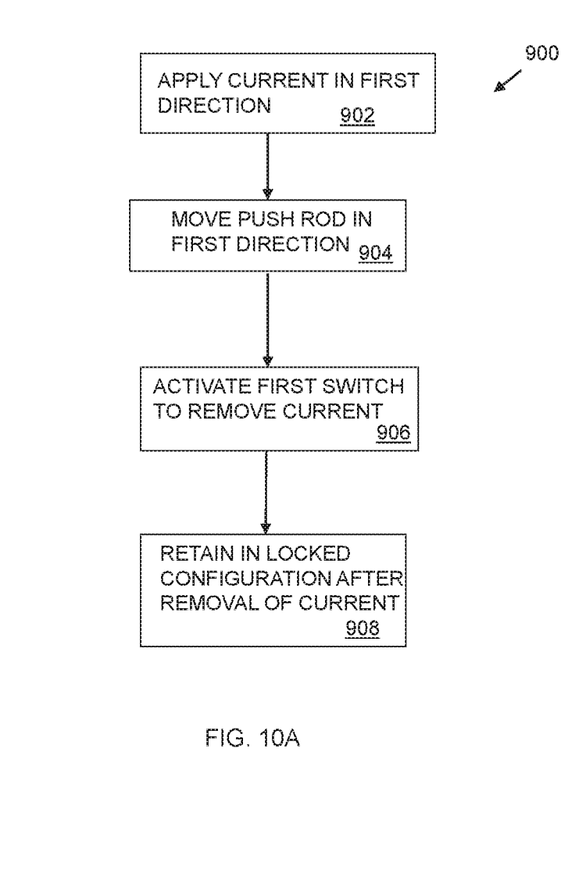
FIG. 10A is a locking flow diagram according to one exemplary embodiment.
Figure 10B:
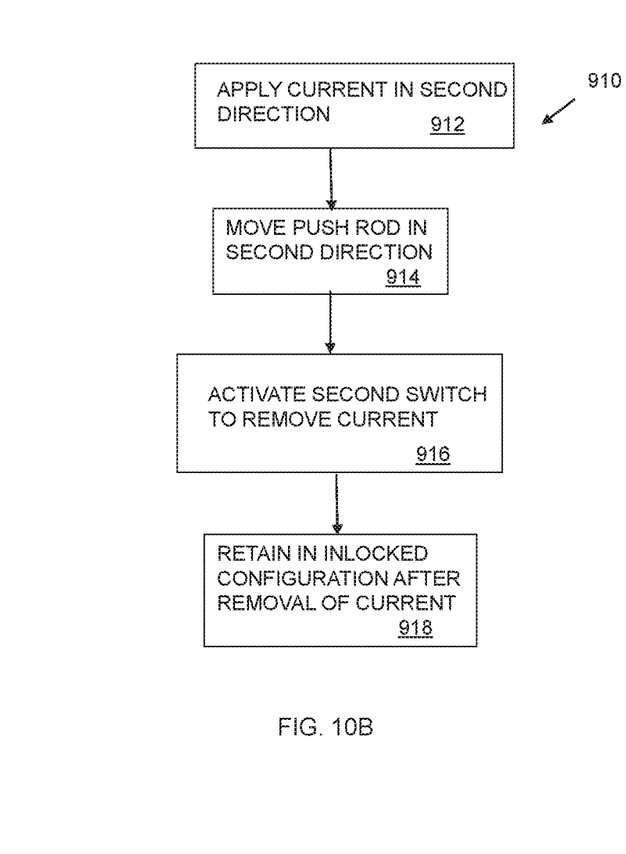
FIG. 10B is an unlocking flow diagram according to one exemplary embodiment.

FIG. 10A illustrates a locking flow diagram 900 for a differential and FIG. 10B illustrates an unlocking flow diagram 910 of exemplary embodiments. The flow diagrams 900 and 910 are provided as a series of sequential steps. The steps may occur in other orders. Hence, embodiments are not limited to the sequence of steps provided in FIGS. 10A and 10B. Referring to FIG. 10A, the locking flow diagram 900 starts by applying a current in a first direction to the electric motor at step (902). This will occur when it is desired for the differential to be locked. The applying of the current can be done under the control of a controller monitoring the current state of a vehicle using the differential or by a manual switch controlled by the operator. In response the current in the first direction, a push rod is moved in a first direction at step (904). As discussed above, in embodiments, the push rod is in communication with a shift dog in an embodiment that selectively locks the differential upon movement of the push rod in the first direction. Once the differential is locked, a first switch is activated to remove the current at step (906). The different remains in the locked configuration after the current is removed from the electric motor at step (908). As discussed above this is done by the frictional configuration of the driven nut on the lead screw. The unlocking flow diagram 910 starts by applying a current in a second direction to the electric motor at step (912). This will occur when it is desired for the differential to be unlocked. The applying of the current can be done under the control of a controller monitoring the current state of a vehicle using the differential or by a manual switch controlled by the operator as discussed above. In response the current in the second direction, the push rod is moved in a second direction at step (914). As discussed above, in embodiments, the push rod is in communication with a shift dog in an embodiment that selectively unlocks the differential upon movement of the push rod in the second direction. Once the differential is unlocked, a second switch is activated to remove the current at step (916). The different remains in the unlocked configuration after the current is removed from the electric motor at step (918). As discussed above this is done by the frictional configuration of the driven nut on the lead screw.

EXAMPLE EMBODIMENTS

Example 1 is a linear actuator that includes a torque generator, a lead screw, a driven nut, an activation circuit and a push rod. The torque generator has an output shaft. The lead screw is operationally coupled to the output shaft of the torque generator. The driven nut has an internally threaded bore that threadably engages external threads of the lead screw in such a manner that frictional forces between the internal threaded bore and the external threads prevent movement between the driven nut and the lead screw when no torque is provided by the torque generator. The activation circuit is in communication with the torque generator. The activation circuit has at least one switch that is configured to be activated by the driven nut. The push rod is operationally coupled to the driven nut.

Example 2, includes the linear actuator of Example 1, further including a shift fork operationally engaged with the push rod. The shift fork configured to manipulate a shift dog in response to movement of the push rod.

Example 3 includes the linear actuator of any of the Examples 1-2, wherein the torque generator is an electric motor.

Example 4 includes the linear actuator of any of the Examples 1-3, further including a circuit board including wiring for the activation circuit and at least one indicator to indicate the position of a component of the linear actuator.

Example 5 includes the linear actuator of any of the Examples 1-4, wherein the at least one switch of the activation circuit further includes a double pole double throw switch; a first switch; and a second switch, the first and second switch configured to be activated by the driven nut.

Example 6 includes the linear actuator of any of the Examples 1-5, wherein the activation circuit further includes a first conductive path; a second conductive path, a first pole of the double switch configured to selectively couple a first side of a power supply to one of the first conductive path and the second conductive path; a third conductive path, a second pole of the double switch configured to selectively couple a second side of the power supply to one of the second conductive path and the third conductive path; a fourth conductive path, the electric motor coupled between the second and fourth conductive paths; a fifth conductive path coupled to a second side of the power supply, the first switch configured to selectively couple one of the fourth and the fifth conductive paths to the first conductive path; and a sixth conductive path coupled to the first side of the power supply, the second switch configured to selectively couple one of the fourth and the fifth conductive paths to the third conductive path.

Example 7 includes the linear actuator of any of the Examples 1-6, further including an input to control the activation of the double pole double throw switch.

Example 8 includes a differential with a linear actuator lock that includes a shift dog, a shift fork, an electric motor, a lead screw, a driven nut, an activation circuit and a push rod. The shift dog is configured to selectively engage a portion of the differential to selectively lock the differential. The shift fork is operationally engaged with the shift dog wherein movement of the shift fork moves the shift dog. The electric motor has an output shaft. The lead screw is operationally coupled to the output shaft of the electric motor. The driven nut has an internally threaded bore that threadably engages external threads of the lead screw in such a manner that frictional forces between the internal threaded bore and the external threads prevent movement between the driven nut and the lead screw when no torque is provided by the torque generator. The activation circuit is in communication with the electric motor. The activation circuit has at least one switch that is configured to be activated by the driven nut. The push rod is operationally coupled to the driven nut. The push rod is further operationally coupled to the shift fork.

Example 9 includes the differential with a linear actuator lock of Example 8, further including a circuit board including wiring for the activation circuit.

Example 10 includes the differential with a linear actuator lock of any of the Examples 8-9, wherein the at least one switch of the activation circuit further includes a double pole double throw switch, a first switch and a second switch. The first and second switch are configured to be activated by the driven nut.

Example 11 includes the differential with a linear actuator lock of any of the Examples 8-10, further including an input to control the activation of the double pole double throw switch.

Example 12 includes the differential with a linear actuator lock of any of the Examples 8-11, further wherein the first switch is positioned to be activated by the driven nut upon completion of a lock stroke causing the electric motor to cease operations, and the second switch is positioned to be activated by the driven nut upon completion of an unlock stroke causing the electric motor to cease operations.

Example 13 is a vehicle including an engine, a transmission, at least one differential and at least one linear actuator. The transmission is operationally coupled to the engine. The at least one differential is operationally coupled to the transmission. The at least one linear actuator is used to selectively lock the at least one differential. The at least one linear actuator includes an electric motor, a lead screw, a driven nut, an activation circuit and a push rod. The electric motor has an output shaft. The lead screw is operationally coupled to the output shaft of the electric motor. The driven nut has an internally threaded bore that threadably engages external threads of the lead screw in such a manner that frictional forces between the internal threaded bore and the external threads prevent movement between the driven nut and the lead screw when no torque is provided by the torque generator. The activation circuit is in communication with the electric motor. The activation circuit has at least one switch that is configured to be activated by the driven nut. The push rod is operationally coupled to the driven nut. The push rod is further operationally coupled to the shift fork.

Example 14 includes the vehicle of Example 13, further including a disconnect located between the transmission and the at least one differential, and a second linear actuator configured to selectively engage and disengage the disconnect.

Example 15 includes the vehicle of any Example 13-14, wherein the at least one switch of the activation circuit further includes a double pole double throw switch to selectively activate the electric motor, a first switch and a second switch. The first and second switch are configured to be activated by the driven nut.

Example 16 includes the vehicle of any Example 13-15, further includes an input to control the activation of the double pole double throw switch.

Example 17 includes the vehicle of any Example 13-16, further wherein the first switch is positioned to be activated by the driven nut upon completion of a lock stroke causing the electric motor to cease operations and the second switch is positioned to be activated by the driven nut upon completion of an unlock stroke causing the electric motor to cease operations.

Example 18 is a method of selectively locking a differential. The method includes applying a current in a first direction to an electric motor to move a driven nut on a lead screw that is operationally coupled to the electric motor. A push rod is moved with the driven nut. The push nut is operationally engaged with a shift dog that is configured to engage a portion of the differential to selectively lock the differential upon movement of the push rod. At least a first switch is activated to remove the current to the electric motor once the shift dog has locked the differential, wherein a configuration of the driven nut on the lead screw retains the differential in a locked configuration after the current has been removed from the electric motor.

Example 19 includes the method of Example 18, wherein activating the at least first switch further includes activating the at least first switch with the driven nut.

Example 20 includes any of the methods of Example 20, further including applying a current in a second direction to the electric motor to move the driven nut on the lead screw in a second different direction. The push rod is moved in the second different direction to disengage the shift dog from the portion of the differential to selectively unlock the differential. At least a second switch is activated to remove the current from the electric motor, wherein a configuration of the driven nut on the lead screw retains the differential in an unlocked configuration after the current has been removed from the electric motor.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A linear actuator comprising:
a torque generator having an output shaft;
a lead screw operationally coupled to the output shaft of the torque generator;
a driven nut having an internally threaded bore that threadably engages external threads of the lead screw in such a manner that frictional forces between the internal threaded bore and the external threads prevent movement between the driven nut and the lead screw when no torque is provided by the torque generator;
an activation circuit in communication with the torque generator, the activation circuit having at least one switch configured to be activated by the driven nut; and
a push rod operationally coupled to the driven nut.

2. The linear actuator of claim 1, further comprising:
a shift fork operationally engaged with the push rod, the shift fork configured to manipulate a shift dog in response to movement of the push rod.

3. The linear actuator of claim 1, wherein the torque generator is an electric motor.

4. The linear actuator of claim 3, further comprising:
a circuit board including wiring for the activation circuit; and
at least one indicator to indicate the position of a component of the linear actuator.

5. The linear actuator of claim 1, wherein the at least one switch of the activation circuit further comprises:
a double pole double throw switch;
a first switch; and
a second switch, the first and second switch configured to be activated by the driven nut.

6. The linear actuator of claim 5, wherein the activation circuit further comprises:
a first conductive path;
a second conductive path, a first pole of the double switch configured to selectively couple a first side of a power supply to one of the first conductive path and the second conductive path;
a third conductive path, a second pole of the double switch configured to selectively couple a second side of the power supply to one of the second conductive path and the third conductive path;
a fourth conductive path, the electric motor coupled between the second and fourth conductive paths;
a fifth conductive path coupled to a second side of the power supply, the first switch configured to selectively couple one of the fourth and the fifth conductive paths to the first conductive path; and
a sixth conductive path coupled to the first side of the power supply, the second switch configured to selectively couple one of the fourth and the fifth conductive paths to the third conductive path.

7. The linear actuator of claim 5, further comprising:
an input to control the activation of the double pole double throw switch.

8. A differential with a linear actuator lock comprising:
a shift dog configured to selectively engage a portion of the differential to selectively lock the differential;
a shift fork operationally engaged with the shift dog wherein movement of the shift fork moves the shift dog;
an electric motor having an output shaft;
a lead screw operationally coupled to the output shaft of the electric motor;
a driven nut having an internally threaded bore that threadably engages external threads of the lead screw in such a manner that frictional forces between the internal threaded bore and the external threads prevent movement between the driven nut and the lead screw when no torque is provided by the torque generator;
an activation circuit in communication with the electric motor, the activation circuit having at least one switch configured to be activated by the driven nut; and
a push rod operationally coupled to the driven nut, the push rod further operationally coupled to the shift fork.

9. The differential with a linear actuator of claim 8, further comprising:
a circuit board including wiring for the activation circuit.

10. The differential with a linear actuator lock of claim 8, wherein the at least one switch of the activation circuit further comprises:
a double pole double throw switch;
a first switch; and
a second switch, the first and second switch configured to be activated by the driven nut.

11. The differential with a linear actuator lock of claim 10, further comprising:
an input to control the activation of the double pole double throw switch.

12. The differential with a linear actuator lock of claim 10, further wherein:
the first switch is positioned to be activated by the driven nut upon completion of a lock stroke causing the electric motor to cease operations; and
the second switch is positioned to be activated by the driven nut upon completion of an unlock stroke causing the electric motor to cease operations.

13. A vehicle comprising:
an engine;
a transmission operationally coupled to the engine;
at least one differential operationally coupled to the transmission; and
at least one linear actuator to selectively lock the at least one differential, the at least one linear actuator including,
an electric motor having an output shaft,
a lead screw operationally coupled to the output shaft of the electric motor,
a driven nut having an internally threaded bore that threadably engages external threads of the lead screw in such a manner that frictional forces between the internal threaded bore and the external threads prevent movement between the driven nut and the lead screw when no torque is provided by the torque generator, an activation circuit in communication with the electric motor, the activation circuit having at least one switch configured to be activated by the driven nut, and a push rod operationally coupled to the driven nut, the push rod further operationally coupled to the shift fork.

14. The vehicle of claim 10, further comprising:

a disconnect located between the transmission and the at least one differential; and a second linear actuator configured to selectively engage and disengage the disconnect.

15. The vehicle of claim 10, wherein the at least one switch of the activation circuit further comprises:

a double pole double throw switch to selectively activate the electric motor;

a first switch; and a second switch, the first and second switches configured to be activated by the driven nut.

16. The linear actuator of claim 15, further comprising:

an input to control the activation of the double pole double throw switch.

17. The linear switch of claim 15, further wherein:

the first switch is positioned to be activated by the driven nut upon completion of a lock stroke causing the electric motor to cease operations; and the second switch is positioned to be activated by the driven nut upon completion of an unlock stroke causing the electric motor to cease operations.

18. A method of selectively locking a differential, the method comprising:

applying a current in a first direction to an electric motor to move a driven nut on a lead screw that is operationally coupled to the electric motor;

moving a push rod with the driven nut, the push nut operationally engaged with a shift dog that is configured to engage a portion of the differential to selectively lock the differential upon movement of the push rod; and activating at least a first switch to remove the current to the electric motor once the shift dog has locked the differential, wherein a configuration of the driven nut on the lead screw retains the differential in a locked configuration after the current has been removed from the electric motor.

19. The method of claim 18, wherein activating the at least first switch further comprises:

activating the at least first switch with the driven nut.

20. The method of claim 18, further comprising:

applying a current in a second direction to the electric motor to move the driven nut on the lead screw in a second different direction;

moving the push rod in the second different direction to disengage the shift dog from the portion of the differential to selectively unlock the differential;

activating at least a second switch to remove the current from the electric motor, wherein a configuration of the driven nut on the lead screw retains the differential in an unlocked configuration after the current has been removed from the electric motor.

* * * * *